United States Patent
Lammert et al.

[11] Patent Number: 6,072,247
[45] Date of Patent: Jun. 6, 2000

[54] CANTILEVERED ACCELERATION SWITCH RESPONSIVE TO ACCELERATION PARALLEL TO PLANE OF SUBSTRATE UPON WHICH THE SWITCH IS FABRICATED AND METHODS

[75] Inventors: Michael Dean Lammert, Manhattan Beach; George William McIver, Redondo Beach, both of Calif.

[73] Assignee: TRW Inc., Lyndhurst, Ohio

[21] Appl. No.: 09/178,392

[22] Filed: Oct. 23, 1998

[51] Int. Cl.[7] ........................................ H01H 35/14
[52] U.S. Cl. ...................... 307/10.1; 307/121; 73/488; 73/514.16; 180/282; 200/61.45 R
[58] Field of Search .................. 307/10.1, 121; 200/61.45 R; 73/514.24, 727, 488, 514.38, 514.16; 257/254; 180/282

[56] References Cited

U.S. PATENT DOCUMENTS

| | | |
|---|---|---|
| 4,543,457 | 9/1985 | Petersen et al. . |
| 4,855,544 | 8/1989 | Glenn . |
| 5,177,331 | 1/1993 | Rich et al. ............................ 200/61.45 |
| 5,387,819 | 2/1995 | Ueno et al. . |
| 5,635,739 | 6/1997 | Grieff et al. ........................ 73/514.24 |
| 5,802,911 | 9/1998 | Cahill et al. ............................. 73/727 |
| 5,821,419 | 10/1998 | Mader et al. ........................ 73/514.38 |
| 5,828,138 | 10/1998 | McIver et al. ........................ 307/10.1 |

*Primary Examiner*—Albert W. Paladini
*Attorney, Agent, or Firm*—Tarolli, Sundheim, Covell, Tummino & Szabo L.L.P.

[57] ABSTRACT

A micro-miniature acceleration switch (e.g., 10) has a substrate (14) and an inertial mass member ("IMM"12) fabricated upon the substrate. The substrate (14) has a planar surface (16), and the IMM (12) is movable relative to the substrate from a first position to a second position when the switch (10) is accelerated along at least one direction parallel to the planar surface by acceleration of sufficient magnitude. Electrical contacts (e.g., 42) are fabricated upon the substrate (14) with at least one contact being coupled to the IMM (12). The contacts (42) move between closed and open positions when the IMM (12) moves between the first position and the second position. In one embodiment, an electrode (e.g., 62) provides an electrostatic force that opposes the acceleration forces and holds the IMM (12) in a holding position until overcome by the predetermined acceleration force. The predetermined acceleration force necessary to trigger the switch (10) may conveniently be adjusted by adjusting the electrostatic force applied by the electrode (62). The switch (10) is particularly useful as a safing switch in a system (140) for controlling an air bag or other vehicle occupant protection device.

41 Claims, 5 Drawing Sheets

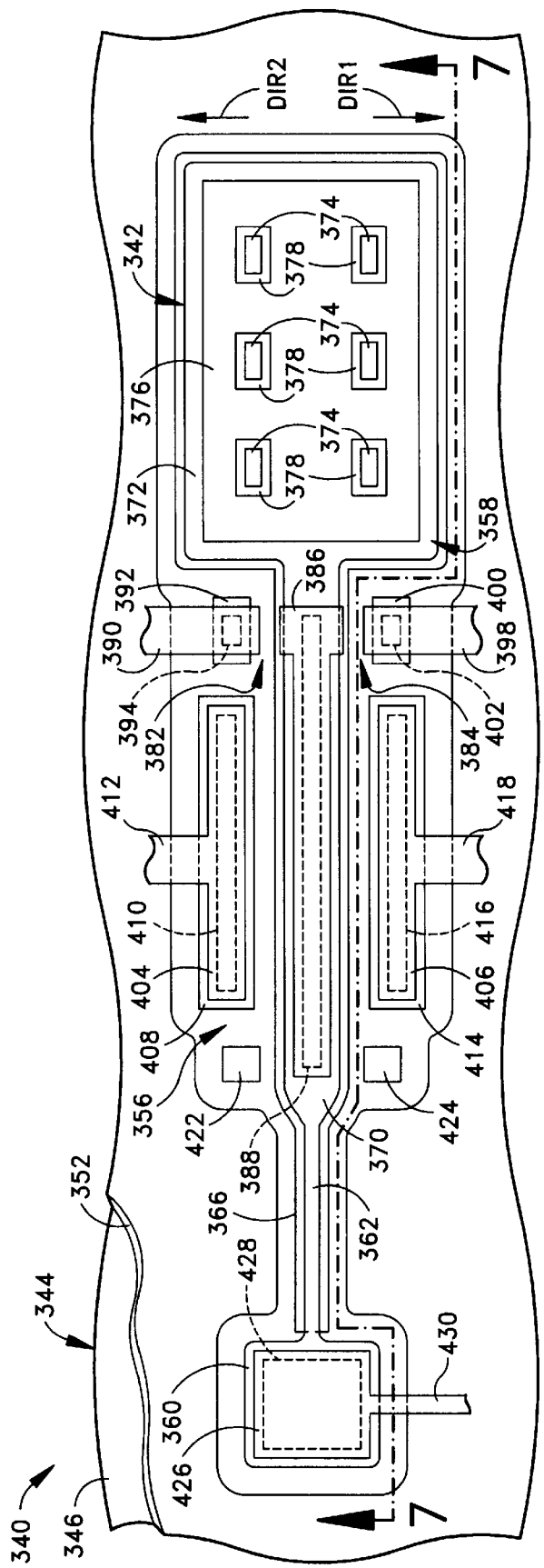
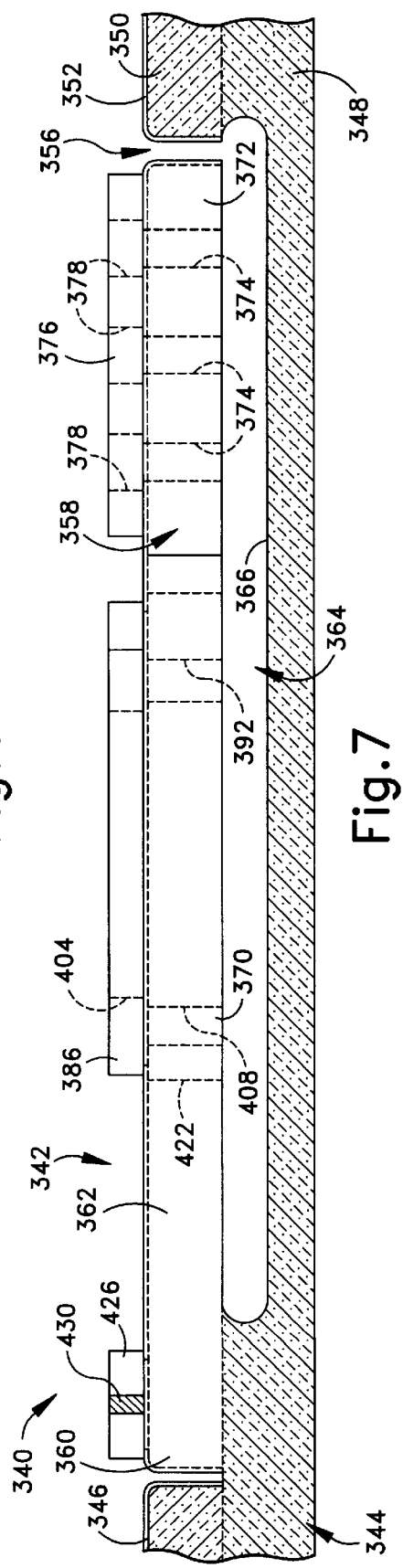
Fig.6
Fig.7

CANTILEVERED ACCELERATION SWITCH RESPONSIVE TO ACCELERATION PARALLEL TO PLANE OF SUBSTRATE UPON WHICH THE SWITCH IS FABRICATED AND METHODS

FIELD OF THE INVENTION

The subject invention relates to an acceleration-sensing switch that is fabricated using semiconductor and/or micromachining technology. More particularly, the subject invention relates to a switch that is actuated by acceleration above a predetermined threshold amount and applied in a direction parallel to a plane of a substrate upon which the switch is fabricated. Further, the predetermined acceleration threshold amount may be electrically adjustable.

BACKGROUND OF THE INVENTION

Vehicle occupant protection systems have, in prior times, used a distributed array of inertia-operated mechanical switches to sense the onset of a collision and trigger the actuation of an occupant protection device (e.g., an air bag or a seat belt retractor). More recently, the type of system that is typically used in vehicles includes one or more electronic acceleration sensors working in cooperation with a microprocessor and sophisticated software. The sensors provide electronic signals proportional to vehicle acceleration. The microprocessor assesses the frequent and rapid changes in the vehicle's acceleration and determines whether a crash event is in progress that requires the actuation of the occupant protection system.

Protection systems using acceleration sensors typically still include one inertia-operated mechanical switch, usually referred to as a "safing switch", for providing a redundant level of detection of the crash event. The safing switch is designed and calibrated to close at a relatively early stage in a crash event. Closure of the safing switch is a necessary condition but not the sole determinant in controlling actuation of the occupant protection system, however. The occupant protection device (e.g., the air bag) is only actuated when the microprocessor determines that the severity of the crash is sufficient to warrant such actuation.

Safing switches presently in use employ an inertial mass that moves, upon vehicle deceleration, against the resilience of a spring. Electrical contacts associated with the switch are coupled to the mass in such a way that the contacts close when the mass moves a certain distance from its initial, or rest, position. Since the deceleration impulse representative of a significant crash varies from one vehicle type to another, the switch design often must be modified to some extent from one vehicle type to another such that the switch will, in each case, close at the appropriate time for that particular vehicle type. Normal manufacturing tolerances, however, still cause the switch actuation point to vary from switch to switch. Thus, each individual safing switch is calibrated during manufacture to "fine tune" the switch closure to the proper deceleration impulse point selected for that vehicle type.

Safing switches now in use are manufactured by processes generally similar to those used to assemble other small mechanical devices. Efforts have been made, however, to develop smaller switches that could be manufactured using techniques like those used to manufacture semiconductor components and/or micro-machined silicon elements. Patents describing such micro-machined switch devices include U.S. Pat. Nos. 5,177,331, 4,855,544, and 4,543,457.

U.S. Pat. No. 5,177,331 discloses an "impact sensor" formed of micro-machined silicon. The "impact sensor" includes contacts that close when the sensor is subjected to an impact. The sensor further includes electrodes between which an electrostatic field appears, creating a force tending to urge the contacts to close. When the contacts are in their unactuated position, the force is too small to perturb the contacts into the closed position. When the contacts close due to an impact, however, the nearness of the electrodes substantially increases the magnitude of the electrostatic field and the resulting force. The increased electrostatic force latches the contacts in the closed position until the field is released.

SUMMARY OF THE INVENTION

In accordance with one aspect, the present invention provides a micro-miniature acceleration switch. The switch includes a substrate having a planar surface and an inertial mass member ("IMM"). The IMM is fabricated upon the substrate and is movable relative to the substrate from a first position to a second position when the switch is accelerated along at least one direction parallel to the planar surface of the substrate by acceleration of sufficient magnitude. Electrical contacts are fabricated upon the substrate. At least one of the contacts is coupled to the IMM. The electrical contacts move between closed and open positions when the IMM moves between the first position and second positions.

In accordance with another aspect, the present invention provides a switch that is adjustably responsive to an acceleration force. The switch includes a substrate having a planar surface and an inertial mass member ("IMM"). The IMM is movable relative to the substrate from a hold position to an actuated position. The IMM is movable when the switch is accelerated along at least one direction parallel to the planar surface of the substrate and is deflectable out of its hold position in response to the switch acceleration of sufficient magnitude. Electrical contacts are provided, with at least one of the contacts being coupled to the IMM. The contacts move between closed and open positions when the IMM moves between the hold position and the actuated position. Hold means of the switch include at least one hold electrode to which a hold voltage may be applied for adjustably establishing an electrostatic field creating a restraining force urging the IMM into its hold position. The restraining force has a magnitude functionally related to the hold voltage. The IMM remains in the hold position when the switch is subjected to acceleration force that is insufficient to overcome force tending to restrain the IMM to the hold position, including the restraining force established by the electrostatic field. The IMM deflects to the actuated position when the switch is subjected to acceleration force that is sufficient to overcome the force tending to restrain the IMM. The acceleration along the at least one direction required to move relatively the IMM from the hold position to the actuated position may be adjusted by selecting the applied hold voltage.

In accordance with another aspect, the present invention provides a method of making a micro-miniature acceleration switch. A substrate is provided. The substrate has a planar surface. An inertia mass member ("IMM") is fabricated upon the substrate such that the IMM is movable between first and second positions along the substrate when the switch is accelerated along at least one direction parallel to the planar surface of the substrate by acceleration of sufficient magnitude. Electrical contacts are fabricated upon the substrate such that at least one electrical contact is coupled with the IMM, and at least one contact is adjacent to the IMM and coupled with the substrate, and such that the contacts are relatively movable between closed and open positions when the IMM moves between the first and second positions.

In accordance with another aspect, the present invention provides a system for recognizing the onset of a crash of a vehicle and providing a control signal indicative thereof. An accelerometer is responsive to crash acceleration of the vehicle and provides a crash acceleration signal that varies as a continuous function of the crash acceleration. Microprocessor means, responsive to the crash acceleration signal, determines from the signal whether the vehicle is experiencing a crash condition. A safing switch is responsive to crash acceleration of the vehicle. The safing switch includes a substrate that has a planar surface, and an inertial mass member ("IMM"). The IMM is fabricated upon the substrate and is movable relative to the substrate from a first position to a second position when the switch is accelerated along at least one direction parallel to the planar surface of the substrate by acceleration of sufficient magnitude. Electrical contacts are fabricated upon the substrate and at least one of the contacts is coupled to the IMM. The contacts move between closed and open positions when the IMM moves between the first position and second positions.

In accordance with another aspect, the present invention provides a method of deploying an occupant protection apparatus in a vehicle as a function of the crash acceleration experienced by the vehicle. A control circuit is provided for assessing changes in the acceleration experienced by the vehicle. The control circuit includes a safing switch that has an inertial mass member ("IMM") movable relative to a planar-extending substrate upon which the IMM is fabricated. The IMM moves in a plane parallel to the extent of the substrate in response to a predetermined crash acceleration applied to the control circuit in a direction parallel to the extent of the substrate and above a predetermined amount to provide an electrical signal indicating a crash event. An electrostatic force is applied to the IMM to urge the IMM in the direction opposite the direction of acceleration movement of the safing switch. The applied electrostatic force is selected according to the predetermined level of acceleration to which the switch is to be responsive. An electrical signal is provided when said IMM moves in response to acceleration of the switch greater than said predetermined crash acceleration level. The occupant crash protection apparatus is actuated when the electrical signal is provided by the IMM.

BRIEF DESCRIPTION OF THE DRAWINGS

The foregoing and other objects and advantages of the present invention will be better understood from the following description, appended claims, and accompanying drawings wherein:

FIG. 6 is a top view of a second embodiment of a safing switch in accordance with the present invention;

FIG. 7 is a view of the safing switch of FIG. 6 taken along line 7—7 of FIG. 6.

DESCRIPTION OF PREFERRED EMBODIMENTS

Figure 1:
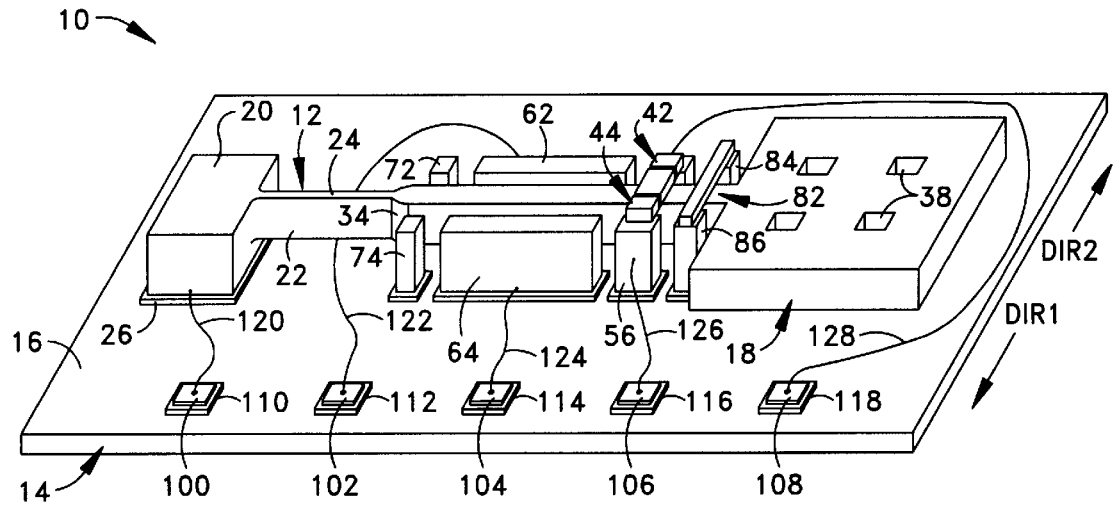
FIG. 1 is a perspective view of one embodiment of a safing switch incorporating the teachings of the present invention.

A safing switch 10 in accordance with the present invention is shown in the perspective view of FIG. 1. The safing switch 10 includes a cantilever mounted inertial mass member (IMM) 12 that is composed of plated metal, such as nickel, fabricated on a substrate 14. The substrate 14 is preferably made of a semiconductor material, such as oxidized silicon or gallium-arsenide, or an insulator material, such as glass or alumina. An upper (as viewed in FIG. 1) surface 16 of the substrate 14 extends in a plane, and the substrate has an overall planar configuration.

It is to be understood that certain direction-descriptive words (e.g., upper) are used herein for the purpose of ease in description and identification of various components of the safing switch 10, and are not intended limit the scope of the present invention. Thus, it is to be understood that the safing switch 10 could be oriented other than as shown in the Figures (e.g., inverted), without departing from the present invention.

The IMM 12 includes a mass platform 18 (FIG. 2) that is attached to a base support 20 by a flexible arm 22. In one embodiment, an upper extent of each of the mass platform 18, the base support 20, and the flexible arm 22 is defined by a single planar surface 24 of the IMM 12. The upper planar surface 24 of the IMM 12 is preferably parallel to the upper surface 16 of the substrate 14.

Figure 2:
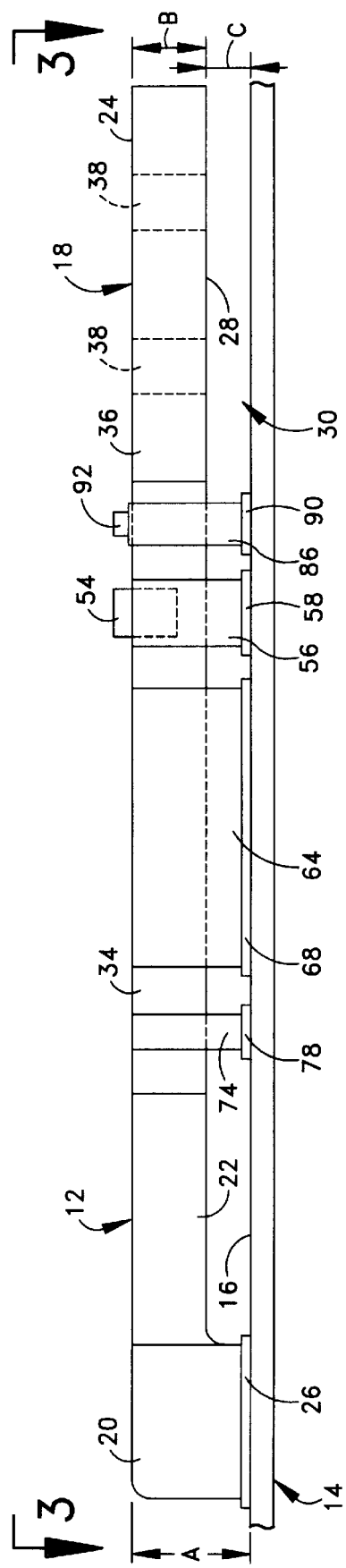
FIG. 2 is a side view of the safing switch of FIG. 1.

A lower extent of the base support 20 is affixed to the upper surface 16 of the substrate 14 by a thin adhesion layer 26 of material. Preferably, the material of the adhesion layer 26 is Cr—Au. As shown in FIG. 2, the overall height of the base support 20 and the adhesion layer 26 is a distance "A". Herein, it is to be understood that height measurements are taken in a direction orthogonal to the plane of the upper surface 16 of the substrate 14.

A lower extent of each of the of the mass platform 18 and the flexible arm 22 is defined by a single planar surface 28 of the IMM 12 that is parallel to the upper surface 16 of the substrate 14. Thus, the height (between lower and upper surfaces) of the mass platform 18 is equal to the height of the flexible arm 22. The height distance value of the mass platform 18 and the flexible arm 22 is designated "B". The distance B is less than the distance A such that an amount of air space 30 is located between the substrate 14 and both the mass platform 18 and the flexible arm 22. The height of the air space 30 is "C". The flexible arm 22 and the mass platform 18 extend out, over the upper surface 16 of the substrate 14, in a cantilever fashion from the base support 20.

The flexible arm 22 (FIG. 3) has a length "D" and a width "E". The width E of the arm 22 is less than the height B (FIG. 2) of the arm. Accordingly, the arm 22 is flexible in directions DIR1 and DIR2 (shown in FIG. 1 and parallel to the upper surface 16 of the substrate 14). The flexible arm 22 is sufficiently rigid to resist flexing in directions orthogonal to the substrate to maintain the mass platform 18 in a suspended position above the substrate. During flexing of the arm 22, the arm is deflected away from a neutral position (shown in FIG. 1).

The mass platform 18 has an elongated shank portion 34 that is connected to the flexible arm 22 and that extends for a length "F" (FIG. 2). A width "G" of the shank portion 34 is greater than the width E of the flexible arm 22. The width G of the shank portion 34 is preferably selected to be sufficiently large to resist flexing.

A head portion 36 (FIG. 3) of the mass platform 18 is located at a distal end of the shank portion 34, away from the flexible arm 22. The head portion 36 has a length "H" and a width "I". Also, in the illustrated embodiment, a plurality of holes 38 is provided. Each hole 38 extends through the head portion 36 in the orthogonal direction. The length H and width I, and the size of the holes 38 are predetermined such that the amount of material present in the head portion 36 of the mass platform 18 is a substantially greater than the amount of material present in the flexible arm 22. Accordingly, an acceleration force that is applied to the safing switch 10 in either the direction DIR1 or the direction DIR2 creates a moment arm from the base support 20 that causes the flexible arm 22 to flex.

Figure 3:
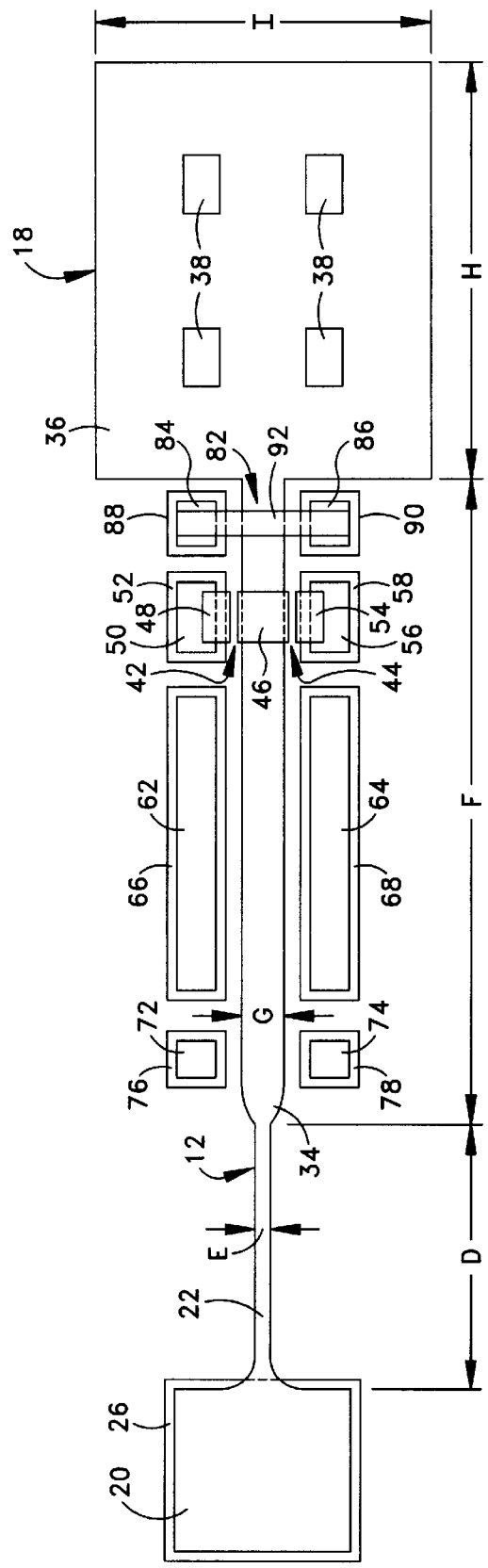
FIG. 3 is a top view of the safing switch of FIG. 2 taken along line 3—3 of FIG. 2.

The movement of the IMM 12 is in a plane that is parallel to the upper surface 16 of the substrate 14 (the substrate is not shown in FIG. 3 for clarity). The movement of the IMM 12 preferably has harmonic characteristics that are dependent upon the parameters of the IMM. Specifically, the flexible arm 22 has spring-like properties. A natural frequency of vibration is present and is dependent upon the parameters and material characteristics of the IMM 12 (e.g., the natural frequency of vibration of the IMM is related to the spring constant and length D of the flexible arm 22, and the mass distribution of the IMM). The frequency can be changed in several ways, e.g., by changing the mass of the mass platform 18 through the addition to the mass platform of a mass (not shown) of a suitable size. Once the safing switch 10 is fabricated, however, the natural frequency of vibration of the IMM 12 is fixed.

The cantilever mounting of the IMM 12 (FIG. 1) permits it to respond to the application of force in either the direction DIR1 or the direction DIR2 by swinging in the plane parallel to the upper surface 16 of the substrate 14. More specifically, when the safing switch 10 is accelerated in the direction DIR1, the mass platform 18 tends to move relative to the substrate 14 in the direction DIR2 away from the neutral position. When the safing switch 10 is accelerated in the direction DIR2, the mass platform 18 tends to move relative to the substrate 14 in the direction DIR1 away from the neutral position. Herein, acceleration-induced movement away from the neutral position is sometimes referred to as "deflection."

The safing switch 10 is equipped with at least one pair (e.g., 42) of electrical contacts that close when a certain amount of deflection of the mass platform 18 occurs relative to the substrate 14. Within certain limits, the movement of the IMM 12 is related to the amount of acceleration applied to the safing switch 10. Thus, it is intended that the at least one contact pair closes when the safing switch 10 is exposed to acceleration above a predetermined threshold amount.

Preferably, two pairs (i.e., first and second pairs) 42 and 44 of electrical contacts are provided, and the electrical contacts are made of gold. In one embodiment, the electrical contact pairs 42, 44 are associated with the shank portion 34 at a location near the head portion 36. The first contact pair 42 is positioned to close upon the occurrence of sufficient acceleration of the safing switch 10 in the direction DIR1 and the second contact pair 44 is positioned to close upon the occurrence of sufficient acceleration of the safing switch in the direction DIR2.

A contact member 46 (FIG. 3) is part of each of the first and second contact pairs 42 and 44 (i.e., the contact member provides one-half of each contact pair). The contact member 46 is affixed to the upper surface 24 of the IMM 12 at the shank portion 34. A width of the contact member 46 is greater than the width G of the shank portion, such that the contact member 46 extends beyond the shank portion on both sides of the shank portion.

The other (i.e., second) half 48 of the first contact pair 42 is located adjacent to the contact member 46 on the shank portion 34 of the IMM 12. A contact support 50 holds the second half 48 of the first contact pair 42 in alignment/registration with the contact member 46. The second half 48 extends toward the contact member 46, beyond the contact support 50.

The contact support 50 is made of a conductive material such as metal (e.g., nickel). An adhesion layer 52 connects the contact support 50 to the substrate 14. The adhesion layer 52 is preferably made of the same material as the adhesion layer 26 for the base support 20.

The second half 54 of the second contact pair 44 is located adjacent to, and in alignment/registration with, the other end of the contact member 46. Similar to the second half 48 of the first contact pair 42, the second half 54 of the second contact pair 44 is supported by a contact support 56. In turn, the contact support 56 is connected to the substrate 14 via an adhesion layer 58. Accordingly, the second half 48 of the first contact pair 42 and the second half 54 of the second contact pair 44 are fixed relative to the substrate 14.

When the IMM 12 is in the neutral position, air space exists between the contacts of the first contact pair 42 and the contacts of the second contact pair 44. The electrical resistance that exists between the contacts of each pair is normally very high (effectively infinite). When the safing switch 10 is subject to acceleration in either direction DIR1 or DIR2 (e.g., parallel to the plane of the substrate 14) of sufficient magnitude, the flexing of the flexible arm 22 causes one of the contact pairs to meet, thereby creating a short circuit at that contact pair. Thus, in accordance with one embodiment of the present invention, the safing switch 10 is normally "open", but "closes" when subject to acceleration above a predetermined threshold amount.

The safing switch 10 includes two electrodes 62 and 64 that extend along the shank portion 34 of the IMM 12. The first electrode 62 is located on the first side of the IMM 12, adjacent to the shank portion 34 and spaced from the shank portion. The second electrode 64 is located on the second side of the IMM 12, adjacent to the shank portion 34 and spaced from the shank portion. The first and second electrodes 62 and 64 are made of a conductive material such as metal (e.g., nickel). The first electrode 62 is connected to the substrate 14 via an adhesion layer 66, and the second electrode 64 is connected to the substrate 14 via an adhesion layer 68.

One or both of the electrodes 62, 64 apply an electrostatic field to the shank portion 34 of the IMM 12. Application of an electrostatic field imposes a holding force on the IMM 12. The holding force is adjustable via adjustment of the electrostatic field. Thus, the electrostatic field, provided via the electrodes 62, 64, permits adjustment/calibration of the amount of acceleration force necessary to cause one of the contact pairs (e.g., the first contact pair 42) to close.

Also, one or both of the electrodes 62, 64 apply an electrostatic test field to the shank portion 34 of the IMM 12. The test field causes the IMM 12 to move during a test scenario. The imposed test field simulates an applied acceleration force. It is to be noted that either one of the electrodes (e.g., 62) can be employed to apply the electrostatic holding force field. The other electrode (e.g., 64) can be employed to apply the electrostatic test field. In other words, the two electrodes 62, 64 have interchangeable functions.

Optional stops are provided in the safing switch 10 to constrain movement of the IMM 12. Specifically, a first lateral stop 72 is positioned on the first side of the IMM 12, adjacent to the shank portion 34. The first stop 72 is spaced from the shank portion 34 in the direction DIR2 when the IMM 12 is in the neutral position. A second lateral stop 74 is positioned on the second side of the IMM 12, adjacent to the shank portion 34. The second stop 74 is spaced from the shank portion 34 in the direction DIR1 when the IMM 12 is in the neutral position. Preferably, the lateral stops 72, 74 are located near the end of the shank portion 34 that is connected to the flexible arm 22.

Preferably, the lateral stops 72, 74 are made of a metal (e.g., nickel), and are adhered to the substrate 14 by adhesion layers 76, 78 (i.e., the stops are fixed relative to the substrate). Each lateral stop (e.g., 72) prevents movement of the IMM 12 beyond an amount that is necessary for a respective contact pair (e.g., 42) to close. One benefit of the lateral stops 72, 74 is that undue force is not applied against the contacts 42, 44 and the contact supports 50, 56 during movement of the IMM 12. Another benefit of the lateral stops 72, 74 is that contact between the shank portion 34 and the electrodes 62, 64 is prevented.

A vertical stop arrangement 82 (FIG. 1) is also optionally provided on the safing switch 10. The vertical stop arrangement 82 includes two support members 84, 86 located adjacent to the shank portion 34. The first support member 84 is located on the first side of the shank portion 34 and the second support member 86 is located on the second side of the shank portion. Preferably, the support members 84, 86 are made of metal (e.g., nickel). The support members 84, 86 (FIG. 3) are affixed to the substrate 14 via adhesion layers 88 and 90, respectively. Thus, the entire vertical stop arrangement 82 is fixed relative to the substrate 14.

A vertical stop member 92 of the vertical stop arrangement 82 is affixed to upper ends of the support members 84, 86, and extends over a segment of the shank portion 34. In one embodiment, the vertical stop member is made of metal (e.g., nickel). The vertical stop member 92 is in close proximity to the shank portion 34, but normally does not engage the shank portion. When the safety switch 10 is subject to a force which is orthogonal to the plane of the substrate 14 that urges the mass platform 18 upward, the vertical stop arrangement 82 limits the amount of vertical movement. One benefit of the vertical stop arrangement 82 is to prevent undue movement and to maintain the components of the safing switch 10 in proper registration.

Electrical bonding pads 100–108 (only shown in FIG. 1 for simplicity) are provided in the safing switch 10 to connect the several components of the safing switch to appropriate external circuitry. Each bonding pad is made of a conductive material (e.g., gold). Preferably, each bonding pad 100–108 is affixed to the substrate by an adhesion layer (e.g., Cr—Au) 110–118.

Turning now to the specifics of the connections, the first bonding pad 100 is electrically connected, via an electrical trace 120 (this and all other electrical traces are schematically shown), to the base support 20. Electrical traces are preferably made from the adhesion layer metal (e.g., Cr—Au). Accordingly, the IMM 12 and the contact member 46 are electrically connected to the first bonding pad 100. The second bonding pad 102 is electrically connected, via an electrical trace 122, to the first electrode 62. The third bonding pad 104 is electrically connected, via an electrical trace 124, to the second electrode 64. The fourth bonding pad 106 is electrically connected, via an electrical trace 126, to the contact support 56 and the second half 54 of the second contact pair 44. The fifth bonding pad 108 is electrically connected, via an electrical trace 128, to the contact support 50 and the second half 48 of the first contact pair 42.

Electrical connections to the bonding pads 100–108 are used to connect the safing switch 10 into a system 140 (FIG. 4) in accordance with the present invention. The system 140 is preferably a vehicle occupant protection system for use in a vehicle, and includes an actuatable occupant protection device 142. Preferably, the occupant protection device 142 includes an air bag module 144 with an inflatable air bag. The system 140 includes a control arrangement that controls a supply of electrical current to an initiator 146 of the protection device 142. Preferably, the initiator 146 is a squib. The squib 146 includes a material that ignites when current of certain magnitude and duration is channeled through the squib. Ignition of the squib 146 causes deployment of the air bag, as will be understood by those skilled in the art.

The squib 146 is connected in series with two electronic switches 148 and 150 across a power source V+ (not shown, per se). As illustrated, the HIGH side switch 148 is a field effect transistor ("FET") or similar device and the LOW side switch 150 is an "NPN" bipolar junction transistor ("BJT") or similar device. When either of the two transistors 148, 150 is in its "OFF" or "HIGH" impedance state, no current passes through the squib 146. Thus, the squib 146 only receives enough current to ignite if both transistors 148, 150 are in their "ON" or "LOW" impedance states.

The transistor 148 is controlled by a microcomputer 152. An accelerometer 154 senses vehicle acceleration and provides to the microcomputer 152 an analog or digital signal 156 having a value indicative of the magnitude of acceleration experienced by the vehicle on which the system 140 is mounted. The microcomputer 152 analyzes the acceleration using software algorithms to determine whether the vehicle is experiencing a deployment crash condition. Such algorithms are known in the art and are not disclosed herein for brevity. When the microcomputer 152 determines that the vehicle is experiencing acceleration of size and character sufficient to warrant deployment of the occupant protection device 142, the microcomputer provides a signal on an output line 158 to switch the transistor 150 from its "OFF" state to its "ON" state.

The LOW side transistor 150 is controlled by the safing switch 10 (schematically represented in FIG. 4 as a signal-pole single-throw switch) in accordance with one aspect of the present invention. The safing switch 10 provides an open or closed current path between a power source (e.g., V+) and an output line 160. The output line 160 is connected to the base of the transistor 150 through a current limiting resistor 162. The base of the transistor 150 is also connected to ground through a pull-down resistor 164. When the safing switch 10 is open, the base of the transistor 150 is pulled to a ground voltage level by the pull-down resistor 164 and the transistor is "OFF". When the safing switch 10 is closed, however, current is supplied to the base of the transistor 150. Thus, when either pair of contacts (e.g., 42, FIG. 1) is closed, base current is supplied to the transistor 150 (FIG. 4) and the transistor is turned "ON". As discussed above, one of the contact pairs 42, 44 close when the safing switch 10 is subject to acceleration in one of its direction of sensitivity (e.g., DIR1 or DIR2) that is greater than a predetermined threshold amount.

The electrodes 62, 64 (not shown in FIG. 4 because of the schematic view) of the safing switch 10 are connected, via calibration lines 168, 170 to a calibration voltage source 172. The calibration voltage source 172 supplies predetermined calibration voltage(s) to one or both of the electrodes 62, 64. When the calibration voltage(s) are utilized, the trigger threshold of the safing switch 10 is set via such calibration voltage(s). Selection of the calibration voltage(s) is done during a calibration step performed as part of the manufacturing process.

During calibration, the calibration voltage is initially set to a high level. The safing switch 10 is then subjected (by means of centrifuge or a "bumper", for example) to the acceleration to which the switch is to be calibrated. The calibration voltage is then lowered until the safing switch 10 triggers. The calibration voltage at the triggering point is then the selected voltage. It may in some cases be desirable to design the voltage source so that it provides a higher voltage for a brief time upon system power up, then drops down to a selected calibration voltage.

Generally, the safing switch 10 is oriented relative to the vehicle such that its axis of sensitivity is parallel to a direction in which acceleration is to be sensed. Further, the axis of sensitivity of the accelerometer 154 and the axis of sensitivity of the safing switch 10 are parallel to each other. For example, if the occupant protection system 140 is to sense a frontal collision of the vehicle, the accelerometer 154 and the safing switch 10 are oriented such that their respective sensitive axes are aligned along the front-to-rear axis of the vehicle.

Each time power is applied to the control arrangement; the microcomputer 152 can preferably test the operation of the safing switch 10, via test communication 174, 176. The testing may include the application of the electrostatic test field to the IMM 12 via one of the electrodes 62, 64. Any suitable arrangement for testing operation of the safing switch 10 can be employed and suitable components added. Accordingly, such testing arrangements are not discussed herein for brevity.

Fabrication of the components of the thus described safing switch 10 occurs directly on the substrate 14. The fabrication is preferably done using micro-machining and semiconductor manufacture techniques.

Figure 5:
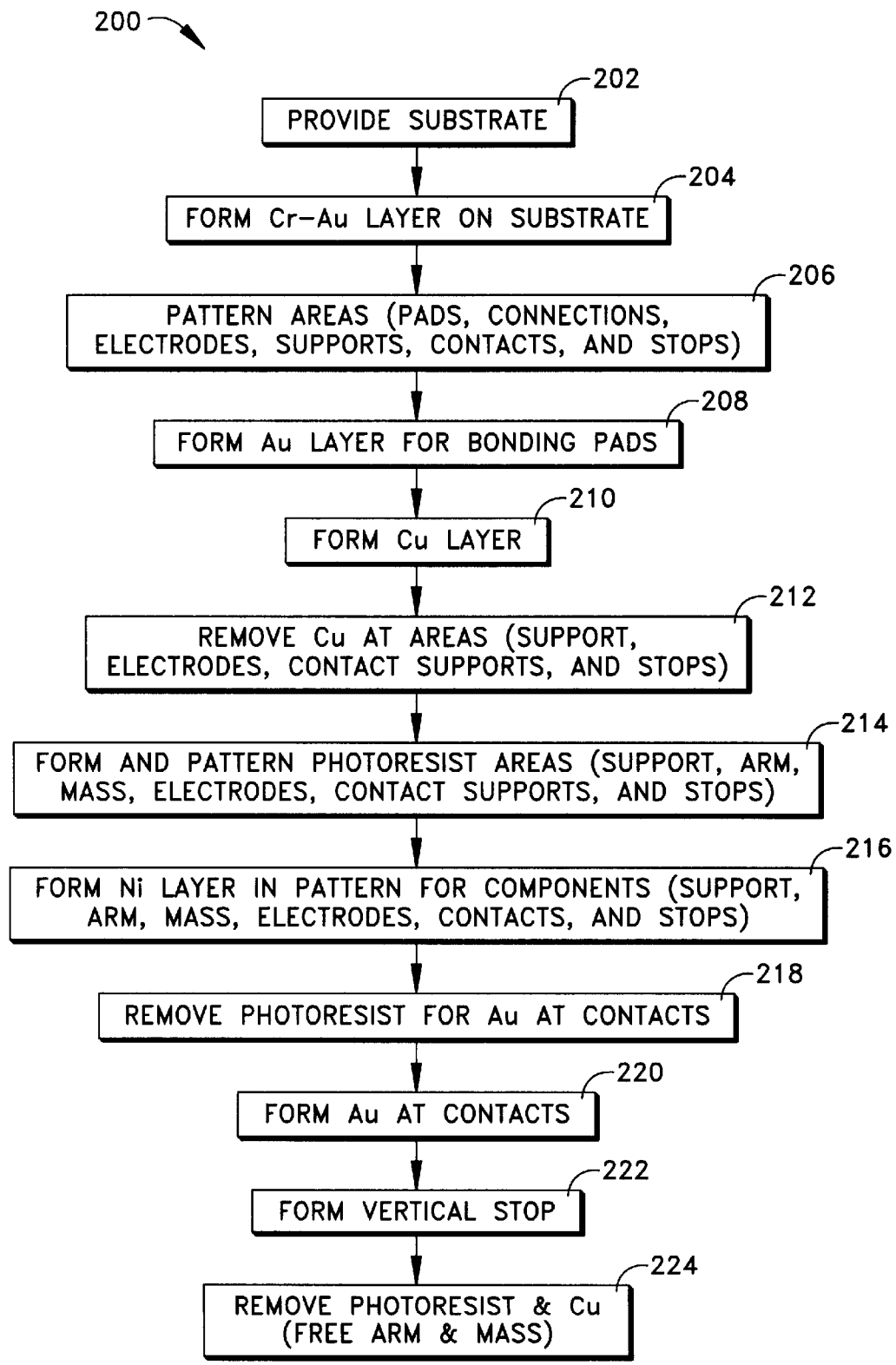
FIG. 5 is a flow chart for a process of making the safing switch of FIG. 1.

A first example of a process 200 for providing the safing switch 10 in accordance with the present invention is set forth in FIG. 5. The process 200 begins at step 202, in which the substrate 14 is provided. At step 204, a layer of material is formed upon the substrate 14. The layer of material is the material which provides the adhesion layers (26, 52, 58, 66, 68, 76, 78, 88, 90 and 110–118) and the material which provides electrical connections (traces) 120, 122, 124, 126, and 128 between bonding pads and components of the device. Accordingly, the layer of material is preferably Cr—Au. The formation of the Cr—Au layer may be by any suitable technique such as evaporation or sputter deposition.

At step 206, the areas for the adhesion layers are patterned using standard lithography techniques. Specifically, the adhesion layers are patterned for the components that are fixed to the substrate (i.e., the base support 20, the contact supports 50 and 56, the electrodes 62 and 64, the lateral stops 72 and 74, the support members 84 and 86, and the bonding pads 100–108) and electrical traces 120, 122, 124, 126, and 128.

At step 208, a layer of gold (Au) is formed for the bonding pads 100–108. The formation of the bonding pads is done via standard lithography techniques. Preferably, the gold layer has a thickness of approximately 0.5 to 2.0 µm.

At step 210, a copper layer is formed over the entire substrate 14. Preferably, the copper layer is approximately 2 to 3 µm thick, and is provided via evaporation or sputter deposition. Portions of the copper layer are selectively removed at step 212. Specifically, the Cu film or layer is removed at the locations of the base support 20, the electrodes 62 and 64, the contact supports 50 and 56, the stops 72 and 74, and the support members 84 and 86 of the vertical stop arrangement 82. The removal of the copper material may be by any suitable technique such as standard lithography etching.

At step 214, a photoresist is formed and patterned to provide areas for the IMM 12 (i.e., the base support 20, the flexible arm 22, and the mass platform 18), the electrodes 62 and 64, the contact supports 50 and 56, the stops 72 and 74, and the support members 84 and 86 of the vertical stop arrangement 82. The photoresist layer is preferably 10–15 µm thick. A layer of metal (preferably nickel) is formed in the pattern provided by the photoresist at step 214. Preferably, the formation of the nickel layer is by plating and is provided to a depth of 10–12 µm. Accordingly, at step 214, many of the components of the safing switch 10 are formed. The components which are formed are the IMM 12, the electrodes 62 and 64, the contact supports 50 and 56, the stops 72 and 74, and the support members 84 and 86. It should be noted that the optional holes 38 through the head portion 36 of the mass platform 18 are formed via appropriate patterning at step 214 followed by the formation of the nickel layer at appropriate locations at step 216 to later facilitate in removal of the copper layer formed at step 210 from under the head portion 36.

At step 218, portions of the photoresist are removed at the locations of the first and second contact pairs 42 and 44. Specifically, the photoresist is removed to provide an area for formation of the contact member 46, the second half 48, and the second half 54. Preferably, the removal of the photoresist is by exposure and is done to a depth of approximately one-half (½) to three-fourths (¾) of the height of the plated nickel in which the contacts are to be formed.

At step 220, a layer of gold is formed to provide the contact pairs 42 and 44 in the areas exposed within the photoresist. At step 222, the vertical stop member 92 is formed. The formation of the vertical stop member 92 may be by any suitable technique such as utilizing two lithography steps. The first step includes pattern plating a second copper layer to define the region where the vertical stop member 92 is to be formed. The second lithography step includes plating a layer of nickel into the pattern to form the vertical stop member 92. The holes 38 in the mass platform 18 aid in removing the copper from under the mass platform 18.

At step 224, the photoresist and the copper materials are removed. The removal of the resist and the copper frees the flexible arm 22 and the mass platform 18. The removal of the material may be by any suitable technique such as etching. Also, the removal of the copper exposes the vertical stop member 92.

Another embodiment of a safing switch 340 in accordance with the present invention is shown in FIGS. 6 and 7. The safing switch 340 is similar to the safing switch 10 of the first embodiment (FIG. 1), in that the safing switch 340 (FIG. 6) of the second embodiment includes a cantilever mounted IMM 342. The safing switch 340 of the second embodiment is also similar to the safing switch 10 (FIG. 1) of the first embodiment, in that the safing switch 340 of the second embodiment is fabricated on a substrate 344. However, the safing switch 340 of the second embodiment has structural features that differ from those of the first embodiment, and the safing switch of the second embodiment is fabricated via a technique different than the technique for the first embodiment.

The components of the safing switch 340 (FIG. 7) are formed upon the substrate 344 using semiconductor technology. Preferably, the substrate 344 includes a silicon or silicon-based material. The substrate 344 has at least one layer of silicon or silicon-based material that has a planar upper surface 346.

In the illustrated embodiment, the substrate includes an n-type silicon layer 348 with a p+ silicon layer 350 (approximately 10 μm deep) on top of the n-type layer. Preferably, the dopant material for the p+ silicon layer 350 is boron. The boron dopant material provides the p+ silicon layer 350 with a relatively low resistivity (e.g., only a few ohms of resistance for the IMM 342).

Also, in the illustrated embodiment, a thin layer of silicon dioxide ($SiO_2$) layer 352 extends over a substantial portion of the p+ layer 350. Because the $SiO_2$ layer 352 is thin and need not extend over the entire p+ layer 350, the $SiO_2$ layer 352 is considered part of the substrate 344 and the upper surface of the $SiO_2$ layer is considered the upper surface 346 of the substrate for the purpose of easy referencing.

A boundary trench 356 (FIG. 5) is defined within the substrate 344 such that the trench extends below the upper surface 346 of the substrate. The IMM 342 is located within the boundary trench 356. Further, because the safing switch 340 is made via semi-conductor technology, the IMM 342 and many of the other components of the safing switching are formed to include some of the same materials as the substrate 344 (i.e., the IMM and most of the other components include p+ silicon with a layer of $SiO_2$). At this point it should be noted that the present invention is not limited by a particular material selection, and that the present invention is intended to encompass similarly constructed devices having different materials.

Turning attention to the structure, the IMM 342 (FIG. 7) includes a mass platform 358 that is attached to a base support 360 by a flexible arm 362 (similar to the first embodiment). An upper extent of each of the mass platform 358, the base support 360, and the flexible arm 362 lies in the same plane as that of the upper surface 346 of the surrounding substrate 344. A lower extent of the base support 360 is connected to the substrate 344 at a location at the bottom of the boundary trench 356.

A lower extent of each of the mass platform 358 and the flexible arm 362 is defined by a single planar surface of the IMM 342 that is parallel to the upper surface of the substrate 344. Located beneath the mass platform 358 and the flexible arm 362 is an air gap 364 located within a release trench 366 extending down into the substrate 344 at a level below the level of the boundary trench 356. Thus, the flexible arm 362 and the mass platform 358 extend out, over the release trench 366, in a cantilever fashion from the base support 360.

The flexible arm 362 has a suitable length, width, and height such that the arm is flexible in directions DIR1 and DIR2 (shown in FIG. 6) and parallel to the plane of the substrate 344. The arm 362 is sufficiently rigid to resist flexing in the direction orthogonal to the plane of the substrate. Accordingly, the mass platform 358 is suspended for movement above the release trench 366. During flexing of the arm 362, the arm and the mass platform 358 are deflected away from a neutral position (shown in FIG. 6).

The mass platform 358 has an elongated shank portion 370 that is connected to the flexible arm 362 and that extends for a suitable length. The shank portion 370 has a suitable width that is greater than the width of the flexible arm 362 such that the shank portion 370 is resistant to flexing.

A head portion 372 of the mass platform 358 is located at a distal end of the shank portion 370, away from the flexible arm 362. The head portion 372 has a suitable length and width, and preferably has a plurality of holes 374 extending through the head portion in an orthogonal direction to facilitate the removal of the material under the head portion 372 to form the air gap 364. Preferably, an extra mass 376 is affixed to the upper surface of the head portion 372. The extra mass 376 has a plurality of holes 378 that are aligned with the holes 374 in the head portion 372. The parameters of the head portion 372 and the extra mass 376 are predetermined such that sufficient mass is present to cause flexing of the flexible arm 362 when the safing switch 340 is subject to acceleration in either of the direction DIR1 or the direction DIR2.

The movement of the IMM 342 is in a plane that is parallel to the upper surface 346 of the substrate 344. Similar to the first embodiment, the movement of the IMM 342 has harmonic characteristics which may be changed by modifying the size parameters of the IMM upon manufacture of the safing switch 340. Also similar to the first embodiment, the cantilever mounting of the IMM 342 permits it to respond to the application of force in either of the direction DIR1 or the direction DIR2 by swinging in the plane parallel to the upper surface 346 of the substrate 344.

The safing switch 340 is equipped with at least one pair of electrical contacts that close when a certain amount of deflection of the mass platform 358 occurs relative to the substrate 344. Within certain limits, the amount of deflection is related to the amount of acceleration applied to the safing switch 340. Thus, it is intended that at least one contact pair closes when the safing switch is exposed to acceleration above a predetermined threshold amount.

Preferably, two pairs 382 and 384 (i.e., first and second pairs) of electrical contacts are provided, and the contacts are made of gold. In the illustrated embodiment, the electrical contacts 382, 384 are associated with the shank portion 370 at a location near the head portion 372. The first contact pair 382 is positioned to close upon the occurrence of sufficient acceleration of the safing switch 340 in the direction DIR1 and the second contact pair 384 is positioned to close upon the occurrence of sufficient acceleration of the safing switch in the direction DIR2.

A contact and metallized region 386, which reduces the resistance of the shank portion 370 of the IMM, is part of each of the first and second contact pairs 382, 384 (i.e., the contact and metallized region provide one-half of each contact pair). The contact and metallized region 386 is affixed to the upper extent of the shank portion 370. In the illustrated embodiment, an area 388 at the upper extent of the shank portion 370 is devoid of the $SiO_2$ material such that the contact and metallized region 386 is partially affixed directly to the silicon material of the shank portion. Thus, the contact and metallized region 386 is electrically connected to the IMM 342.

The contact and metallized region 386 is T-shaped with the "head" of the "T" providing the contact function and the "leg" of the T extending along the shank portion 370. At the head of the T, the width of the contact and metallized region 386 is greater than the width of the shank portion 370, such that the T-head portion extends beyond the shank portion on both sides of the shank portion.

The other (i.e., second) half 390 of the first contact pair 382 is located adjacent to a first side of the T-head of the contact and metallized region 386. A first contact support 392 holds the second half 390 of the first contact pair 382 in alignment/registration with the contact and metallized region 386. The first contact support 392 extends upward from the bottom of the boundary trench 356 at a location between the shank portion 370 and an outermost extent of the boundary trench. Similar to the IMM 342, the first contact support 392 is comprised of a layer of silicon covered with a layer of $SiO_2$. The second half 390 of the first contact pair 382 is affixed to an upper extent of the first contact support 392. In the illustrated embodiment, an area 394 at the upper extent of the first contact support 392 is devoid of the $SiO_2$ material such that the second half 390 of the first contact pair 382 is partially affixed directly to the silicon material of the first contact support (i.e., the second half 390 of the first contact pair 382 is electrically connected to the first contact support 392).

Figure 4:
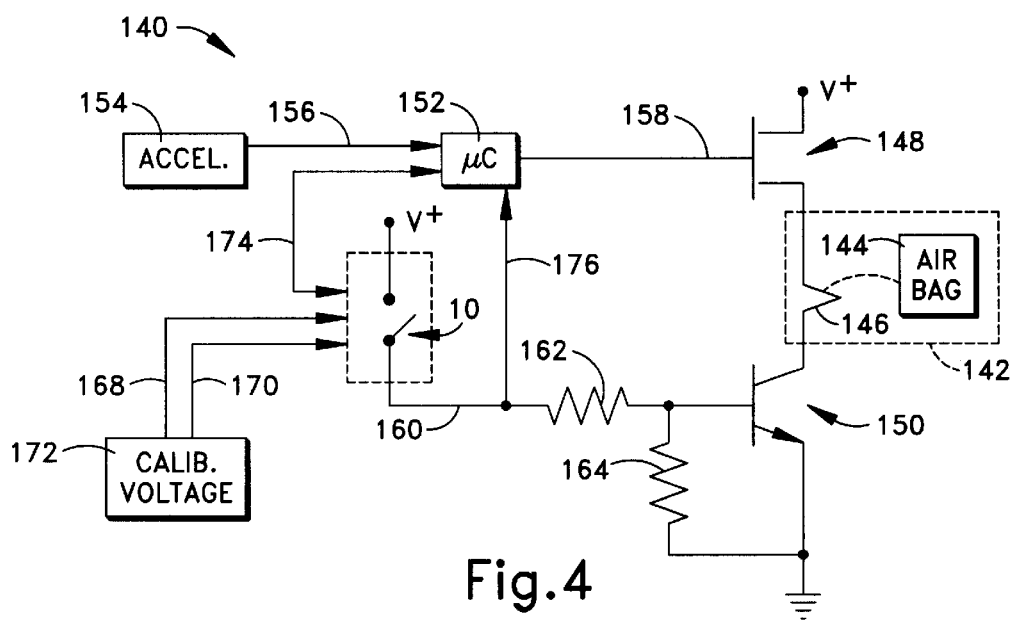
FIG. 4 is a schematic circuit diagram of an occupant protection system that incorporates the safing switch of FIG. 1.

The second half 390 of the first contact pair 382 extends from the first contact support 392 to the substrate 344, across a portion of the boundary trench 356 (i.e., an air gap exists beneath a portion of the second half 390). In other words, the second half 390 of the first contact pair 382 is "air-bridged" across the boundary trench 356 to the substrate 344. The second half 390 of the first contact pair 382 is connected via a trace (not shown) to a bonding pad (not shown) that is located on a portion of the substrate 344 that is not shown. Connections are made to this and other bonding pads of the safing switch 340 to connect the safing switch in to a system such as shown in FIG. 4.

The second half 398 of the second contact pair 384 is located adjacent to, and in alignment/registration with, the other end of the T-head of the contact and metallized region 386. Similar to the second half 390 of the first contact pair 382, the second half 398 of the second contact pair 384 is supported by a second contact support 400. Connection is made to the upper surface of the second contact support 400, with an area 402 of the second contact support being devoid of the $SiO_2$ material (i.e., the second half 398 of the second contact pair 384 is electrically connected to the second contact support 400). The second half 398 of the second contact pair 384 is air-bridged across, from the second contact support 400 to the substrate 344. A trace (not shown) connects the second half 398 of the second contact pair 384 to a bonding pad (not shown).

When the IMM 342 is in the neutral position, air space exists between the contacts of the first contact pair 382, and air space exists between the contacts of the second contact pair 384. When the safing switch 340 is subject to acceleration in either direction DIR1 or DIR2 (e.g., parallel to the plane of the substrate 344) of sufficient magnitude, the flexing of the flexible arm 362 causes one of the contact pairs to engage, thereby closing that contact pair. This creates a low resistance path between the closed metal contact (390 or 398) and contact metal 430 of the IMM base support 360. To further reduce the resistance in the IMM's flexible arm region 362, a thin layer of metal (not shown) may be deposited on top of flexible arm 362, connecting metallized region 386 and contact region 430.

The safing switch 340 includes two electrodes 408 and 414 that extend parallel to the shank portion 370 of the IMM 342. Electrodes 408 and 414 are contacted by metallized regions 404 and 406. The first electrode 408 is located on a first side of the IMM 342, and is adjacent to, but spaced from, the shank portion 370 of IMM 342.

The first electrode 408 is constructed similar to the first contact support 392, in that the first electrode 408 has a silicon layer covered with a layer of $SiO_2$. In the illustrated embodiment, a portion of the silicon $SiO_2$ layer is devoid from an area 410 such that the metallized layer 404 is adhered to the silicon layer (i.e., the first electrode 408 is electrically contacted by metallized layer 404).

A lead 412 extends across a portion of the boundary trench 356 from the metallized layer 404 to the substrate 344. Thus, similar to the second half 390 of the first contact pair 382, the lead 412 going to the first electrode 408 is "air-bridged" across a portion of the boundary trench 356. An electrical trace (not shown) is connected between the lead 412 and a bonding pad (not shown).

The second electrode 414 is located on the second side of the IMM 342. Similar to the first electrode 408, the second electrode 414 is adjacent to, but spaced from, the shank portion 370 of IMM 342.

The second electrode 414 is constructed similar to the first electrode 408 (i.e., with a silicon layer and a covering $SiO_2$ layer). Also, an area 416 is devoid of the $SiO_2$ material to allow contact of the second electrode 414 with the metallized layer 406 (i.e., the second electrode 414 is electrically contacted by metallized layer 406). A lead 418 from the metallized region 406 is air-bridged and is connected, via a trace (not shown), to a bonding pad (not shown).

Applying a voltage to one of the electrodes 408 or 414 creates an electrostatic field between that electrode and the shank portion 370 of the IMM 342. Application of an electrostatic field imposes a holding force on the IMM 342. The holding force is adjustable, similar to the adjustment of the holding force in the first embodiment. Also, similar to the first embodiment, at least one of the electrodes 408 or 414 provides an electrostatic test field.

As an optional feature, stops 422, 424 are provided to limit the amount of movement of the IMM 342 in the lateral directions. Specifically, the first lateral stop 422 is positioned on the first side of the IMM 342 adjacent to the shank portion 370. The first lateral stop 422 is located within the boundary trench 356 at a location between an outer extent of the boundary trench and the shank portion 370. The first lateral stop 422 is spaced away from the shank portion 370 in the direction DIR2 when the IMM 342 is in the neutral position. Preferably, the first lateral stop 422 is constructed similar to the first contact support 392 and the first electrode 408, in that it has a silicon layer with a covering layer of $SiO_2$.

The second lateral stop 424 is positioned on the second side of the IMM 342, within the boundary trench 356 and adjacent to the shank portion 370. Construction of the second lateral stop 424 is similar to the construction of the first lateral stop 422. Preferably, the laterals stops 422, 424 are located near the end of the shank portion 370 that is connected to the flexible arm 362.

A base contact 426 is affixed to an upper extent of the base support 360 of the IMM 342. Preferably, the base contact 426 is made of a metal such as gold. In the illustrated embodiment, an area 428 is devoid of $SiO_2$ such that the base contact 426 is affixed to the silicon layer of the base support 360. A lead 430 from the base contact 426 is "air-bridged" across the boundary trench 356 to the substrate 344. The lead 430 is connected, via a trace (not shown), to a bonding pad (not shown). Electrically, base contact 426 is connected to the "T-shaped" metallization layer 386 through p+ silicon region of the base support 360, the flexible arm 362, and the shank portion 370, or through a thin metal layer on top of the flexible arm (not shown).

Similar to the first embodiment, the safing switch 340 of the third embodiment can control the transistor 150 (FIG. 4) of the system 140. Specifically, the IMM 342 moves in the plane parallel to the substrate 344 in response to acceleration on the safing switch 340 in either the direction DIR1 or the direction DIR2. When the applied acceleration exceeds a predetermined threshold amount, one of the contact pairs (e.g., 382) close such that the transistor 150 is turned ON.

Figure 8:
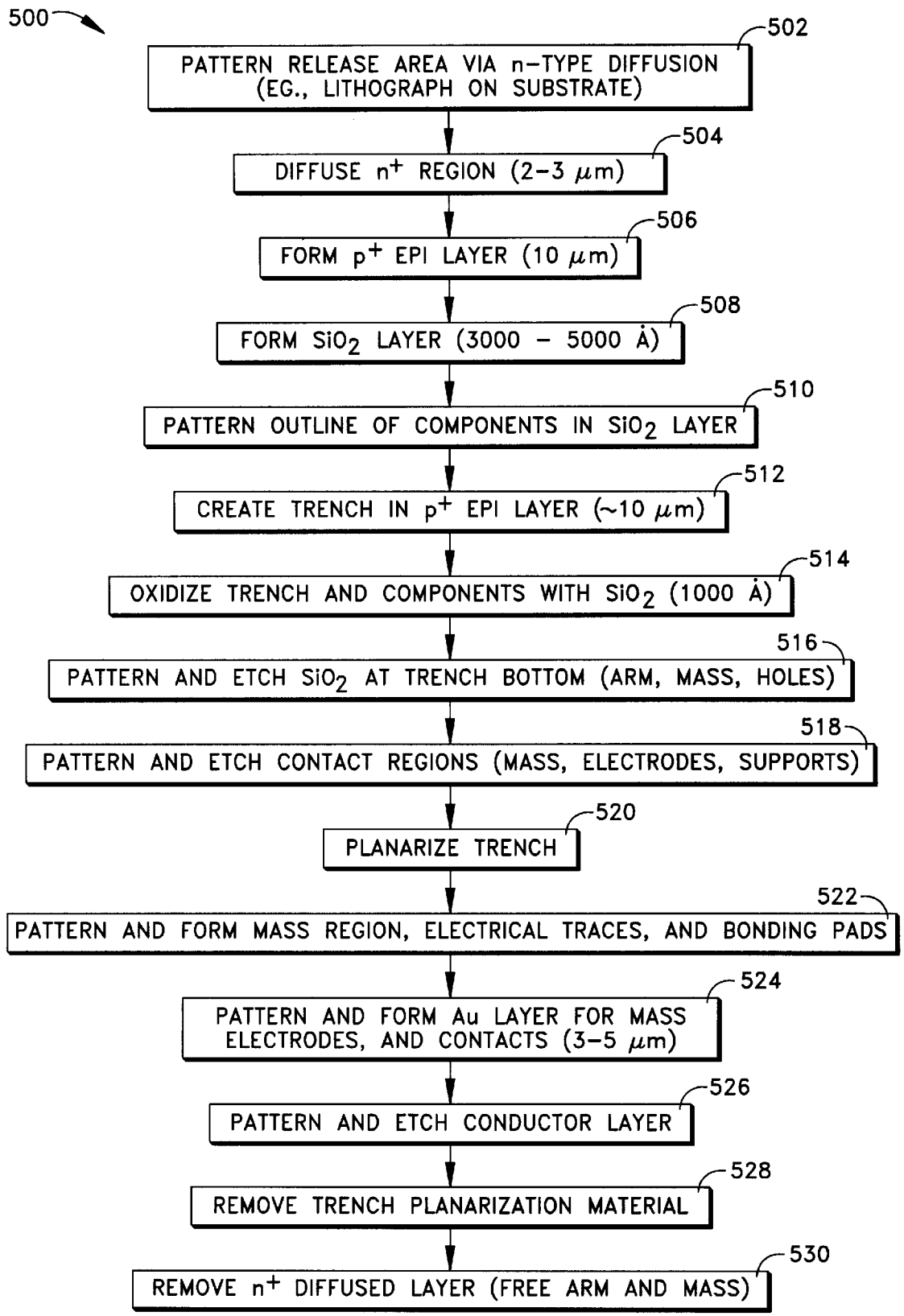
FIG. 8 is a flow chart for a process of making the safing switch of FIG. 6.

An example of a process 500 for providing the safing switch 340 of the second embodiment in accordance with the present invention is set forth in FIG. 8. The process 500 begins at step 502 in which a "release area" for the IMM 342 is patterned into a provided silicon substrate layer (i.e., n-type layer 348). The patterning of the release area is preferably via heavily doped n-type diffusion or an implantation using standard lithography techniques. Preferably, the n-type dopant is antimony or arsenic. The release area is the area that defines the release trench 366. At step 504, the diffusion is completed to a depth of preferably 2–3 µm. Preferably, the diffusion occurs via use of a high temperature drive.

The p+ epi layer 350 is grown over the n-type layer 348 of the substrate 344 at step 506. Preferably, the thickness of the p+ layer is about 10 µm. At step 508, a $SiO_2$ layer is grown over the p+ layer 350. Preferably, the thickness of the $SiO_2$ layer is 3,000–5,000 Angstroms. The growth of the $SiO_2$ layer is preferably by thermal oxidation.

At step 510, the outlines of many components of the safing switch 340 are patterned in the $SiO_2$ layer. Specifically, the IMM 342, the first and second contact supports 392 and 400, the first and second electrodes 408 and 414, and the first and second lateral stops 422 and 424, and the outer periphery of the boundary trench 356 are patterned and particular portions of the $SiO_2$ layer are removed. Also, the optional holes 374 extending through the head portion 372 of the IMM 342 are patterned. It should be noted that the optional holes 374 are provided to permit easier etching of a portion of the material below the head portion 372 at a subsequent step. The pattern forming of the outline in the $SiO_2$ is preferably via standard lithography with dry or wet etching.

The boundary trench 356 is created at step 512 via dry etching of the material of the p+ layer 350 exposed via $SiO_2$ removal in step 510. The boundary trench preferably is etched to a depth of approximately ten (10) µm. At step 514, the boundary trench sidewalls and bottom (and the bottom of each optional hole), and components are oxidized with a growth of $SiO_2$. Preferably, the layer of $SiO_2$ has a depth of approximately 1,000 Angstroms.

At step 516, a pattern form is used to etch the $SiO_2$ at the boundary trench bottom adjacent to the flexible arm 362 and mass platform 358 (and optional holes 374). The patterned $SiO_2$ material is then etched away to expose the n+ region of the n-type layer 348 around the flexible arm 362 and the mass platform 358 (and the holes 374). Preferably, the removal of material is via a dry etching technique.

At step 518, the areas 394, 402, 410, 416, and 428 (on the contact supports 392 and 400, the electrode supports 408 and 414, and the base support 360) are patterned in the $SiO_2$. The patterned $SiO_2$ is then removed to expose the p+ material. Preferably, the removal is via an etch technique.

The boundary trench 356 is planarized at step 520. In one preferred technique, the planarization includes providing a layer of organic material that fills the trench and then removing any of the organic material that extends upward out of the trench.

At step 522, a conductor metal layer is formed. The metal layer is provided to create the electrical traces (not shown), and also to provide a metal adhesion layer for the areas for the extra mass 376, the bonding pad areas (not shown), electrical contacts 386, 390, and 398, electrode metallized regions 404 and 406, and base support metallized region 426. Optionally, this conductor metal layer can be used to directly contact "T-shaped" contact 386 to base support metallization 426. The forming of step 522 may include a sputter or evaporation technique to deposit the conductor material.

At step 524, a gold layer is formed to create the extra mass 376, the electrical contacts 386, 390 and 398, and the electrode metallized regions 404 and 406. The second halves 390 and 398 of the first and second contact pairs 382 and 384 include portions that will become air-bridged because the portions rest on the planarizing organic material. Preferably, the layer of gold is approximately 3–5 µm thick. At step 526, the conductor layer, which was deposited at step 522, is patterned and etched to create the electrical traces.

At step 528, the organic planarization material is removed from the boundary trench 356. Preferably, an $O_2$ plasma dry etch is used to remove the organic material.

The flexible arm 362 and mass platform 358 are released at step 530. Specifically, the material of the n+ diffused layer is removed to create the release trench 366 and provide the air gap 364 that exists underneath the flexible arm 362 and the mass platform 358. Preferably, the removal of the n+ diffused material is via selective dry or wet etching.

Although the present invention has been described in considerable detail with reference to certain preferred versions thereof, it will be appreciated by those skilled in the art that various rearrangements or alterations of parts may be made without departing from the spirit and scope of the present invention, as defined in the appended claims.

Having described the present invention, the following is claimed:

1. A micro-miniature acceleration switch comprising:
a substrate having a planar surface;
an inertial mass member ("IMM") fabricated upon said substrate and movable relative to said substrate from a first position to a second position when said switch is accelerated along at least one direction parallel to said planar surface of said substrate by acceleration of sufficient magnitude; and
electrical contacts fabricated upon said substrate, at least one of which is coupled to said IMM, for moving between closed and open positions when said IMM moves between said first position and said second position.

2. A switch as set forth in claim 1, wherein said IMM includes a deflectable spring-like arm, said switch includes means for suspending said arm in cantilever fashion above said substrate such that said arm extends generally parallel to said substrate.

3. A switch as set forth in claim 2, wherein one of said electrical contacts is fixed relative to said substrate at a location adjacent to said IMM and offset along said planar surface from said one electrical contact coupled to said IMM.

4. A switch as set forth in claim 1, wherein said electrical contacts include first and second pairs of electrical contacts, one contact of each of said first and second pairs of contacts is coupled to said IMM and the other of each of said first and second pairs of contacts is fixed relative to said substrate.

5. A switch as set forth in claim 4, wherein said first pair of electrical contacts is adapted to close when said IMM moves from said first position to said second position, said IMM is movable from a third position to a fourth position when the switch is accelerated along a direction opposite to said at least one direction, said second pair of electrical contacts is adapted to close when said IMM moves from said third position to said fourth position.

6. A switch adjustably responsive to an acceleration force, said switch comprising:

a substrate having a planar surface;

an inertial mass member ("IMMI") movable relative to said substrate from a hold position to an actuated position, said IMM relatively moving when said switch is accelerated along at least one direction parallel to said planar surface of said substrate and being deflectable out of its hold position in response to said switch acceleration of sufficient magnitude;

electrical contacts, at least one of which is coupled to said IMM, for moving between closed and open positions when said IMM moves between said hold position and said actuated position;

hold means comprising at least one hold electrode to which a hold voltage may be applied for adjustably establishing an electrostatic field creating a restraining force urging the IMM into its hold position, said restraining force having a magnitude functionally related to said hold voltage; and means for applying a hold voltage to said hold electrode; and wherein said IMM remains in said hold position when said switch is subjected to acceleration force along said at least one direction that is insufficient to overcome force tending to restrain said IMM to said hold position, including the restraining force established by said electrostatic field, and deflects to said actuated position when said switch is subjected to acceleration force along said at least one direction that is sufficient to overcome said force tending to restrain said IMM, whereby the acceleration along said at least one direction required to move relatively said IMM from said hold position to said actuated position may be adjusted by selecting the hold voltage applied to said hold means.

7. A switch as set forth in claim 6 further comprising means for adjusting said restraining force of said hold means by varying said hold voltage.

8. A switch as set forth in claim 6, wherein said hold electrode and said electrical contacts are disposed on opposite sides of said IMM.

9. A switch as set forth in claim 6, wherein said hold electrode and said the electrical contacts are disposed on the same side of said IMM.

10. A switch as set forth in claim 6, wherein said IMM comprises plated metal.

11. A switch as set forth in claim 10, wherein said plated metal is plated nickel.

12. A switch as set forth in claim 6, wherein said substrate is comprised of a semiconductor material.

13. A switch as set forth in claim 12, wherein said semiconductor is silicon.

14. A switch as set forth in claim 6 further comprising a substrate adapted to be mounted on a member whose acceleration is to be sensed, wherein said IMM comprises a deflectable spring-like arm having a predetermined mass, and means for suspending said arm in cantilevered fashion above said substrate such that said arm extends generally parallel to said substrate.

15. A switch as set forth in claim 14, wherein said means for suspending comprises a base mounted on said substrate, said deflectable arm being rigidly joined to said base at the proximal end of said arm such that deflection of said IMM results in bending of said arm.

16. A switch as set forth in claim 14, wherein at least one of said electrical contacts is positioned adjacent said IMM along said substrate, and said electrical contacts are adapted to be normally open and to close when said arm of said IMM is deflected by acceleration of sufficient magnitude in the at least one direction.

17. A switch as set forth in claim 14, wherein said electrical contacts comprise first and second pairs of electrical contacts, with one contact of each said pair being coupled to said IMM for movement therewith and the other contact of said pair being coupled to said substrate.

18. A switch as set forth in claim 17, wherein one of said pairs of electrical contacts is positioned on one side of said IMM and is adapted to close when said IMM moves in one direction relative to said substrate, and the other of said pairs of electrical contacts is positioned on another side of said IMM and is adapted to close when said IMM moves in a second direction relative to said substrate.

19. A switch as set forth in claim 14, wherein said hold electrode is disposed on said substrate, and is adjacent to said arm.

20. A switch as set forth in claim 19, wherein said arm has disposed thereon a second electrode generally in registration adjacent to said hold electrode.

21. A switch as set forth in claim 20, wherein said arm is formed of an electrically conductive material and said arm electrode is an integral part thereof.

22. A method of making a micro-miniature acceleration switch, said method comprising:

providing a substrate having a planar surface;

fabricating an inertia mass member ("IMM") upon the substrate such that the IMM is movable between first and second positions along the substrate when the switch is accelerated along at least one direction parallel to the planar surface of the substrate by acceleration of sufficient magnitude;

fabricating electrical contacts upon the substrate such that at least one electrical contact is coupled with the IMM, and at least one contact is adjacent to the IMM and coupled with the substrate, and such that the contacts are relatively movable between closed and open positions when the IMM moves between the first and second positions.

23. A method as set forth in claim 22, wherein said step of fabricating the IMM includes providing a layer of a first material onto the substrate except for certain locations including a location for a support portion of the IMM, providing a second material for the IMM, and removing the first material.

24. A method as set forth in claim 22, wherein said step of fabricating the IMM includes providing a first material in a first layer extending across at least a portion of the substrate, providing a second material for the IMM in a second layer extending across at least a portion of the first layer, removing the material of the first layer to provide an air space between the substrate and the second layer so that the IMM can move relative to the substrate.

25. A method as set forth in claim 22, wherein said step of fabricating the IMM includes forming a portion of the IMM as a flexible arm that is flexible to move in a plane parallel to the planar surface of the substrate.

26. A method as set forth in claim 22, wherein said step of fabricating electrical contacts includes providing an electrically conductive material on the IMM to form one contact and providing electrically conductive material on a member extending perpendicular from the substrate and offset from the IMM in a direction along the substrate.

27. A method as set forth in claim 22, wherein said step of fabricating the IMM includes creating a pattern of the IMM in a first material, providing a second material for the IMM into the pattern, and removing the first material.

28. A method as set forth in claim 27, wherein said step of creating a pattern of the IMM includes patterning the IMM in a photoresist layer as the first material, said step of providing a second material includes depositing metal into the pattern defined within the photoresist.

29. A method as set forth in claim 22, wherein said step of fabricating the IMM includes forming a portion of the IMM that is free to move relative to the planar surface of the substrate and in a plane relative to the planar surface.

30. A method as set forth in claim 29 including providing an intermediate layer of material between the substrate and a portion of the IMM that is fixed relative to the substrate.

31. A method as set forth in claim 22, wherein said step of fabricating the IMM includes patterning a release area in a material of the substrate.

32. A method as set forth in claim 31, wherein said step of patterning includes diffusion or ion implanting.

33. A method as set forth in claim 31, wherein said step of fabricating the IMM includes growing a layer of material over at least the release area.

34. A method as set forth in claim 33, wherein said step of fabricating the IMM includes accomplishing removal of material in an outline of the IMM.

35. A method as set forth in claim 34, wherein said step of accomplishing removal of material includes patterning an outline of the IMM with a pattern material.

36. A method as set forth in claim 34, wherein said step of fabricating the IMM includes removing material in the release area.

37. A system for recognizing the onset of a crash of a vehicle and providing a control signal indicative thereof, comprising:

an accelerometer responsive to crash acceleration of said vehicle for providing a crash acceleration signal which varies as a continuous function of said crash acceleration;

microprocessor means responsive to the crash acceleration signal for determining from said signal whether said vehicle is experiencing a crash condition; and a safing switch responsive to crash acceleration of said vehicle, said safing switch comprising:
  a substrate having a planar surface;
  an inertial mass member ("IMM") fabricated upon said substrate and movable relative to said substrate from a first position to a second position when said switch is accelerated along at least one direction parallel to said planar surface of said substrate by acceleration of sufficient magnitude; and
  electrical contacts fabricated upon said substrate, at least one of which is coupled to said IMM, for moving between closed and open positions when said IMM moves between said first position and second positions.

38. A system as set forth in claim 37 including hold means responsive to a voltage for applying an electrostatic force to said IMM to bias said IMM into said first position, and means for applying a voltage to said hold means to thereby establish the magnitude of the bias on said IMM and thus the predetermined vehicle crash acceleration necessary to force said IMM from said first position to said second position; and means responsive to said microprocessor means and to said electrical signal provided by said electrical contact means for providing said control signal in accordance therewith.

39. The system as set forth in claim 37 including an occupant protection device for protecting a vehicle occupant upon a crash of the vehicle, said occupant protection device being responsive to said control signal for controlling the operation of said device.

40. The system as set forth in claim 39, wherein occupant protection device includes an air bag.

41. A method of deploying an occupant protection apparatus in a vehicle as a function of the crash acceleration experienced by said vehicle comprising the steps of:

providing a control circuit for assessing changes in the acceleration experienced by said vehicle, said control circuit including a safing switch having an inertial mass member ("IMM") movable relative to a planar-extending substrate upon which the IMM is fabricated, said IMM moving in a plane parallel to the extent of said substrate in response to a predetermined crash acceleration applied to said control circuit in a direction parallel to the extent of said substrate and above a predetermined amount to generate an electrical signal indicating a crash event;

applying an electrostatic force to said IMM to urge said IMM in the direction opposite the direction of acceleration movement of said safing switch, said applied electrostatic force being selected according to the predetermined level of acceleration to which said switch is to be responsive;

generating an electrical signal when said IMM moves in response to acceleration of said switch greater than said predetermined crash acceleration level; and actuating said occupant crash protection apparatus when said electrical signal is being generated by said IMM.

* * * * *